United States Patent [19]

Duval et al.

[11] Patent Number: 5,360,684
[45] Date of Patent: Nov. 1, 1994

[54] ELECTROCHEMICAL CELL FOR POLYMER ELECTROLYTE-LITHIUM BATTERIES (ACEP)

[75] Inventors: Michel Duval, Montreal; Yves Giguere, Ste-Julie, both of Canada

[73] Assignee: Hydro-Quebec, Montreal, Canada

[21] Appl. No.: 140,534

[22] Filed: Oct. 25, 1993

[51] Int. Cl.$^5$ .............................................. H01M 10/38
[52] U.S. Cl. ........................................ 429/162; 429/192
[58] Field of Search ............... 429/192, 188, 152, 191, 429/162

[56] References Cited

U.S. PATENT DOCUMENTS 4,303,748 12/1981 Armand et al. .
4,578,326 3/1986 Armand et al. .
4,758,487 7/1988 Stolka et al. .

Primary Examiner—Anthony Skapars
Attorney, Agent, or Firm—Oblon, Spivak, McClelland, Maier & Neustadt

[57] ABSTRACT

In an electrochemical cell consisting of a superposition by lamination of positive and negative electrodes, a solid polymer electrolyte as well as a metallic collector in which the negative electrode and collector layers are slightly offset with respect to each other so as to permit lateral current collection, a band of insulating material is inserted so as to prevent the free edge of the collector facing the layer of electrolyte and/or the negative electrode layer from cutting through the electrolyte layer and/or thereby short-circuiting the two electrodes. The disclosure also describes the preparation of such an electrochemical cell.

18 Claims, 1 Drawing Sheet

ELECTROCHEMICAL CELL FOR POLYMER ELECTROLYTE-LITHIUM BATTERIES (ACEP)

BACKGROUND OF INVENTION

1. Field of the Invention

The invention relates to electrochemical cells for lithium/solid polymer electrolyte batteries. More particularly, the invention concerns electrochemical cells based on a lithium anode and a solid polymer electrolyte, and with lateral current collection, including a band of insulating material disposed so as to prevent the free edge of the collector which faces the electrolyte and/or the layer of negative electrode from cutting through the electrolyte and/or from short-circuiting the two electrodes. The invention also concerns a process for preparing electrochemical cells in which the free edge of the collector is protected by a band of insulating material.

2. Description of Prior Art

The general principle of polymer electrolyte batteries of the ACEP type (polymer electrolyte battery) and lithium anode is described in Armand U.S. Pat. No. 4,303,748. The materials preferably used in these batteries (copolymers, cross-linked polymers, salts, active materials for the electrodes) as well as the methods for preparing them are described, inter alia, in U.S. Pat. Nos. 4,578,326 and 4,758,487.

An ACEP battery consists of a metallic collector for the positive electrode (cathode), a film of a cathode, a film of a polymer electrolyte, a film of a negative electrode (lithium anode) and an insulating film. Each of these films typically has a thickness between 5 and 50μ, for a total final thickness between 100 and 150μ, about thirty meters of film, 15 cm wide being typically necessary to give a battery of 100 Wh. Different types of possible assembly for these different components are described in U.S. applications Ser. Nos. 337,522 filed Feb. 21, 1989, now U.S. Pat. No. 5,100,746, and 342,538 filed Feb. 21, 1989, now abandoned. An appropriate way of assembly consists in slightly offsetting each of these films, so as to be able to laterally collect the current which originates from each of the electrodes, as in a condenser, rather than through the ends of the film. In this arrangement, one of the edges of the collector is used to collect the current which comes from the cathode. The other edge which will hereinafter be referred to as the free edge of the collector, faces the electrolyte and/or the negative electrode, following an offset mounting. Such an assembly causes the following problem: the metallic collector of the positive electrode (cathode) is generally made of a foil of aluminum, nickel or another metal which, even at low thickness, has a free cutting edge which is capable of directly contacting the negative electrode or of cutting through the layer of electrolyte, consisting of a relatively flexible polymer, and to thereby cause a short-circuit with the lithium anode, leading to the destruction of the battery.

SUMMARY OF INVENTION

The present invention proposes to place for example between the collector of the positive electrode and the negative electrode, a band of insulating film which overlaps the free edge of the metallic collector, is more rigid than the electrolyte and is highly resistant against a cut by the free edge of the collector. This insulating band may also ensure an insulation between the collector and the negative electrode when the electrolyte is shorter than the collector or when the collector is made of a material which electrochemically reacts with lithium such as metallized polyester.

The basic material for this insulating band is a film or a fabric of insulating plastic which does not chemically or electrochemically react with the active materials of the batteries (lithium, electrolyte, positive electrode) and is not deformed at the temperature at which it is used. A film of polypropylene, polyethylene, polyurethane, or any other known compatible plastic material may for example be used, as well as films which are normally not compatible with lithium [polyester, TEFLON*, FEP (fluorinated polymer of ethylene and propylene), polyamide], but are made so by means of a thin surface coating of polyethylene or polypropylene. Films or fabrics of inorganic materials (glass fiber, boron nitride) are also possible. Capacitor grade polypropylene is particularly appropriate because of its inert character and an absence of impurities.

The insulating band may also be covered, in certain cases, on the side of the metallic collector, with a thin coating of a thermosealable adhesive material so as to prevent the band from being displaced during assembly. This adhesive should also be compatible with the active materials of the battery and for example should not contain volatile products which could react and reduce the performance of the battery. It should be thermosealable under acceptable temperatures for the materials of the battery so as not to become separated. Adhesives based on thermoplastic polyethylene or polyester are satisfactory. An example of appropriate thermosealable insulating film is Transkote #150 OPP, a polypropylene film covered with a thermoplastic polyester adhesive., available from Transilwrap Canada of Toronto, for covering labels or documents. Polymer lithium batteries assembled with this film have shown satisfactory cycling behavior as compared to batteries containing no such insulating band.

The choice of the thickness and width of the insulating band is generally made so as to minimize its weight and volume in the battery, to facilitate its positioning during assembly and not to cause an excess thickness. A band 5 to 50μ thick, typically 25μ, and 3 to 12 mm wide, typically 6 mm, generally gives satisfaction, the essential characteristic being that the edge is well protected and that the band does not move once it is in place.

The setting of the band may be carried out at different stages of the battery assembly, as can be seen from the examples which follow, either on the collector alone, or on the collector already covered with its cathode, or on the collector covered with its cathode and its electrolyte.

Generally, the invention concerns an electrochemical cell consisting of a superposition of layers of a positive electrode, a solid polymer electrolyte, as well as a lithium negative electrode, the positive electrode being in contact with a layer of metallic collector and the negative electrode being covered with an insulating film, the layers of negative electrode and metallic collector being offset with respect to each other in order to enable to collect the current laterally, the collector having then a free edge, such as defined previously and which must be protected. For that latter purpose the electrochemical cell includes a band of insulating material which does not react with the materials of the electrodes and of the electrolyte and does not become deformed at the temperature where the cell is used. The band of insulating material is installed between the constitutive layers of the cell so that when the different layers including the collector and the insulating material are laminated to constitute the cell, the band prevents the free edge of the collector from cutting through the layer of electrolyte and/or thereby short-circuiting the two electrodes. This insulating band may also provide insulation between the collector and the negative electrode when the electrolyte is shorter than the collector on its free edge side or when the collector consists of a material such as metallized polyester which reacts electrochemically with lithium.

According to a preferred embodiment of the invention, the band of insulating material is mounted between the electrolyte layer and the collector layer so as to lay across the free edge of the collector, and alongside the positive electrode.

According to another preferred embodiment of the invention, the band of insulating material is thermosealable so that the portion of the latter which is in contact with the collector may be heat sealed against the latter.

According to another preferred embodiment of the invention, the material of the electrolyte layer is slightly adhesive and the band of insulating material is non-thermosealable, allowing the latter to stay in place solely through adhesion to the former. Preferably, the band of insulating material in this case is placed on the electrolyte layer between the latter and the negative electrode layer, so as to lay across and protect the free edge of the collector.

According to another embodiment of the invention, the band of non-thermosealable insulating material is place on the adhesive electrolyte layer between the latter and the collector layer, so as to lay across the free edge of the collector and alongside the positive electrode.

The band of insulating material has a thickness which varies between about 5μ and 50μ, preferably about 25μ for the thermosealable band and 8μ for the non-thermosealable band.

According to another embodiment of the invention, the band of thermosealable insulating material is heat-sealed on the collector by means of a thermosealable or thermoplastic adhesive which is compatible with the elements of the cell. For example, the adhesive may have a thickness between about 1 and 10μ, such as about 1 to 2μ.

According to another embodiment of the invention, the band of insulating material is made of polypropylene or polyethylene, or of TEFLON (PTFE), FEP, polyester, or polyamide, covered with a thin layer of polyethylene or polypropylene of about 1 to 2μ.

According to another embodiment, the band of insulating material has a width between about 3 and 125 mm, for example about 6 mm.

The invention also concerns a process for the preparation of an electrochemical cell in which layers of a positive electrode, a solid polymer electrolyte, as well as a negative lithium electrode, are superposed, the positive electrode is contacted with a layer of a metallic collector, the negative electrode being covered with an insulating film, the layers of negative electrode and of the collector are offset with respect to each other in order to enable to collect the current laterally, and the free edge of the collector is protected. According to this process, a band of insulating material which does not react with the materials of the electrodes, the collector and the electrolyte and which does not become deformed at temperatures where the cell is used, is placed so that when the different layers including the collector and the insulating film are laminated to constitute the cell, the band then prevents the free edge of the collector from cutting through the electrolyte layer and/or thereby short-circuiting the two electrodes. As mentioned above, this insulating band may also provide insulation between the collector and the negative electrode when the electrolyte is shorter than the collector on its free edge side, or when the collector consists of a material such as metallized polyester which electrochemically reacts with lithium.

According to another embodiment of the invention, the band of insulating material is placed between the electrolyte layer and the collector layer, so as to lay across the free edge of the collector, and alongside the positive electrode.

According to another embodiment, an electrolyte layer of slightly adhesive material and a band of insulating material which is not thermosealable are used, and the band is applied over the layer of adhesive electrolyte.

According to another embodiment of the invention, the band of insulating material is placed over the electrolyte layer, between the latter and the layer of negative electrode, so as to lay across and protect the free edge of the collector.

According to another embodiment, a band of the not thermosealable insulating material is applied on the layer of adhesive electrolyte between the latter and the layer of positive electrode, lay across the free edge of the collector and alongside the positive electrode.

BRIEF DESCRIPTION OF DRAWINGS

The invention is illustrated without limitation by means of the annexed drawings in which.

DESCRIPTION OF PREFERRED EMBODIMENTS

Figure 1:
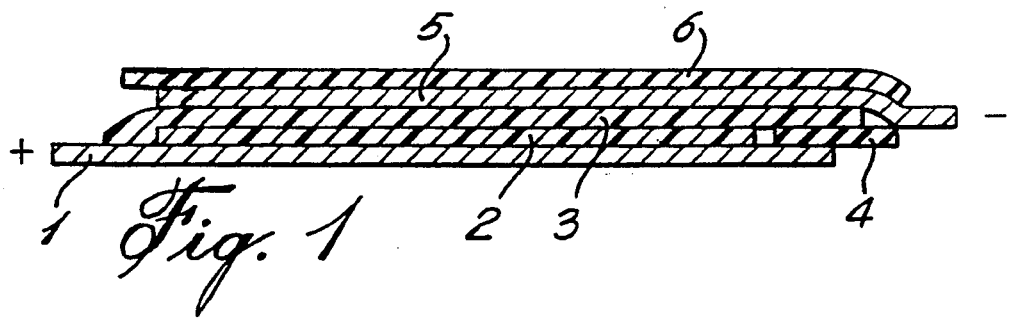
FIG. 1 is a schematic illustration of an electrochemical cell according to the invention, with a band of insulating material inserted between the collector and the electrolyte layer.

With reference to the drawings, more particularly FIG. 1, it will be seen that the electrochemical cell consists, for example, of a vanadium oxide based positive electrode 2, including a metallic collector 1 of aluminum. Also illustrated is a negative electrode 5 of lithium covered with a polypropylene insulating film 6. The electrolyte 3, placed between the two electrodes 2 and 5 is made of a slat-containing solid polymer such as defined in U.S. Pat. Nos. 4,303,748; 4,578,526 and 4,758,487. It will be seen that the outside layers 1 and 5 have been offset to permit a lateral collection of the current (terminals + and − on the Figure). With respect to the positive electrode 2, between collector 1 and electrolyte 3, a band of insulating material 4, for example of polypropylene or other plastic material such as mentioned above, has been placed to lay across the free edge of the collector. This insulating band 4 may also ensure insulation between collector 1 and negative electrode 5 when the electrolyte 3 on the right side (free edge side) of the Figure, is shorter than collector 1 (which is not illustrated in the drawings) or when the collector 1 consists of a material such as metallized polyester which electrochemically reacts with lithium.

Figure 2:
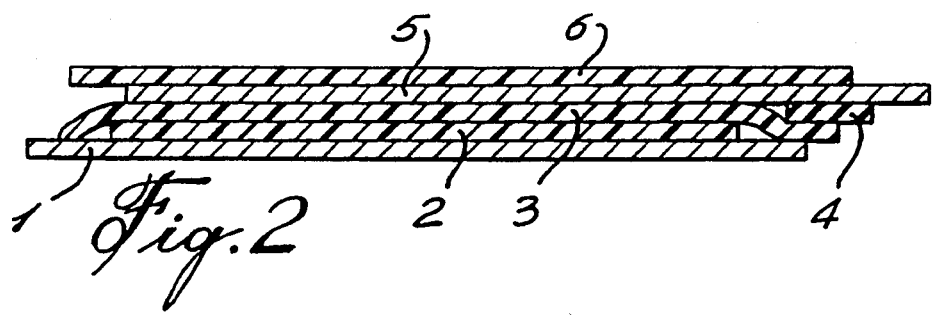
FIG. 2 is a schematic illustration of another electrochemical cell according to the invention with a band of insulating material inserted between the electrolyte and the negative electrode layer.
Figure 3:
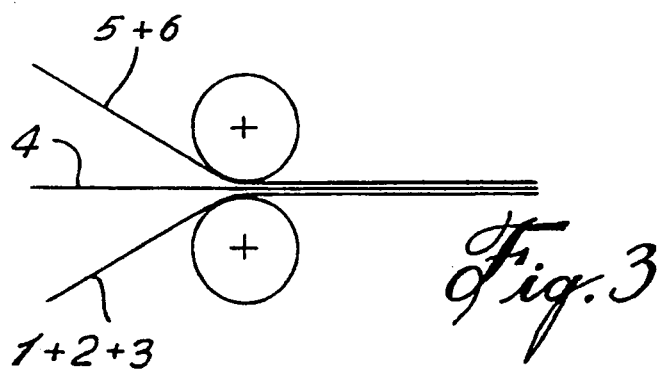
FIG. 3 is a schematic illustration showing the lamination of a cell according to the invention, including an insulating band.
Figure 4:
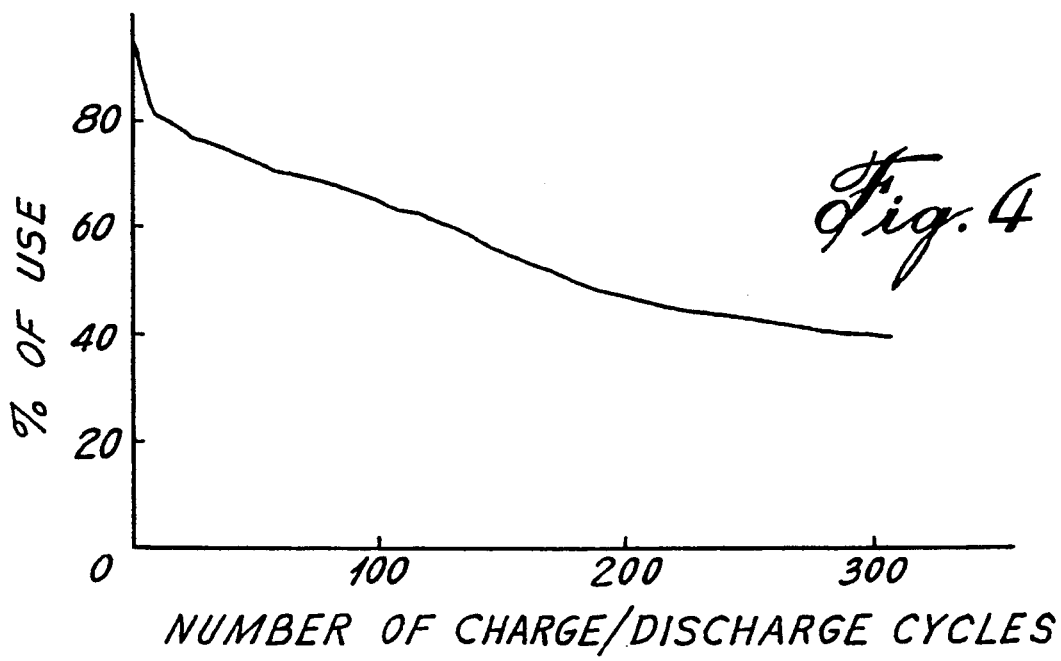
FIG. 4 is a curve showing the cycling behavior of an electrochemical cell according to the invention.

According to an alternative illustrated in FIG. 2, the insulating band 4 was placed between electrolyte 3 and the negative lithium electrode 5, but in a same position to lay across the free edge of the collector. Referring now to FIG. 3, it will be seen how the lateral insulating band 4 is laminated with the film of lithium 5 and a half-battery consisting of a collector 1, a positive electrode 2 and a solid polymer electrolyte 3.

The invention is also illustrated by means of the examples which follow given without limitation.

EXAMPLE 1

A web of aluminum foil 16 cm wide and $15\mu$ thick is used as metallic collector and coating substrate for the positive electrode. The aluminum foil is first sent through a laminator consisting of a steel roll heated at 85° C. and a silicone rubber roll. A narrow band of Transkote Transilwrap $25\mu$ thick and 6 mm wide is laminated all along one of the edges of the aluminum foil, so that 3 mm of the band lays over the aluminum and 3 mm unsupported outside the aluminum. The thermoplastic adhesive melts while passing through the laminating rolls so that the band remains permanently glued to the aluminum foil after leaving the laminating rolls. The aluminum foil with its protection band along its edge is thereafter sent towards a coating machine. A solution of the positive electrode, containing vanadium oxide, is deposited thereon and the solvent is evaporated in a drying tunnel to give a film of positive electrode $40\mu$ thick and 15 cm wide. This assembly consisting of the aluminum collector, the film of positive electrode and the band for protecting the edge is then laminated with an electrolyte film $30\mu$ thick and 16 cm wide centered on this assembly, then with a film of lithium $20\mu$ thick and 16 cm wide, offset with respect to the aluminum foil so as to overlap the insulating band protecting the free edge of the aluminum foil by about 2 mm. A 16 cm film of polypropylene $8\mu$ thick is finally added to enable to roll the battery on itself without short-circuiting the electrodes. The assembly thus prepared constitutes a battery of the ACEP type, with a voltage of 3.4 volts and the current collected on the sides of the battery.

EXAMPLE 2

A film of positive electrode is first prepared on its aluminum collector, then a band of Transilwrap is laminated over one edge of the aluminum foil, procedures otherwise are as in example 1 to produce the intended battery.

EXAMPLE 3

A film of positive electrode is first prepared on its aluminum collector, then the electrolyte film is laminated on the film of positive electrode to give a film of "half-battery" (collector+positive+electrolyte). The 3 following films are then laminated simultaneously: the half-battery, a band of non-thermosealable polypropylene 6 mm wide and $8\mu$ thick, positioned so as to overlap and protect the free edge of aluminum, and the lithium electrode film. Procedures are otherwise as in example 1 to obtain the intended battery. In this case, the electrolyte, which is slightly tacky, serves as an adhesive for the band of polypropylene and prevents it from moving during the subsequent assembling processes.

We claim:

1. Electrochemical cell comprising a superposition of layers of a positive electrode, a solid polymer electrolyte, lithium negative electrode, the positive electrode being in contact with a layer of metallic collector and the negative electrode being covered by an insulating film, the negative electrode and collector layers being offset with respect to each other so as to enable lateral current collection, the collector then having a protected free edge, said cell being protected by incorporating in said electrochemical cell a band of an insulating material which does not react with materials of the electrodes and of the electrolyte and is not deformed at the temperatures where said cell is used, said band of insulating material being placed between layers constituting said cell so that when the various layers including the collector and the insulating film are laminated to constitute the cell, said band prevents the free edge of the collector from cutting through the layer of electrolyte and/or thereby short-circuiting the two electrodes, said insulating band also capable of ensuring insulation between the collector and the negative electrode when the electrolyte is shorter than the collector on its free edge side or when the collector consists of a material which reacts electrochemically with lithium such as metallized polyester.

2. Electrochemical cell according to claim 1, wherein said band of insulating material is placed between said electrolyte layer and said collector layer, so as to lay across the free edge of the collector and alongside the positive electrode.

3. Electrochemical cell according to claim 2, wherein the band of insulating material is thermosealable so that the portion of the latter in contact with the collector may be thermosealed to the latter.

4. Electrochemical cell according to claim 1, wherein the material of the electrolyte layer is slightly adhesive and the band of insulating material is non-thermosealable, allowing the latter to stay in place solely through adhesion of the former.

5. Electrochemical cell according to claim 4, wherein the non-thermosealable band of insulating material is placed on the electrolyte layer between the latter and the negative electrode layer, so as to lay across and protect the free edge of the collector.

6. Electrochemical cell according to claim 4, wherein the non-thermosealable band of insulating material is placed on the electrolyte layer between the latter and the collector layer, said band of insulating material laying across the free edge of the collector and alongside the positive electrode.

7. Electrochemical cell according to claim 1, wherein the band of insulating material has a thickness between about $5\mu$ and $50\mu$.

8. Electrochemical cell according to claim 1, wherein the thickness of the band of insulating material is about $25\mu$ when it is thermosealable.

9. Electrochemical cell according to claim 1, wherein the thickness of the band of insulating material is about $8\mu$ when it is non-thermosealable.

10. Electrochemical cell according to claim 1, wherein the band of insulating material is thermoplastic, heat cross-linkable and electrochemically compatible with the other materials of said cell.

11. Electrochemical cell according to claim 10, wherein the band of insulating material is made of polypropylene, polyethylene, or of PTFE, FEP polyester or polyamide covered with a thin layer of polyethylene or polypropylene about 1 to 10μ thick.

12. Electrochemical cell according to claim 10, wherein the band of insulating material is thermosealed on the collector by means of a thermosealable or thermoplastic adhesive which is electrochemically compatible with the materials of the cell.

13. Electrochemical cell according to claim 12, wherein the adhesive has a thickness between about 1 and 10μ.

14. Electrochemical cell according to claim 13, wherein the thickness of the adhesive is about 1 to 2μ.

15. Electrochemical cell according to claim 12, wherein the adhesive consists of a polypropylene film covered with a thermoplastic polyester adhesive.

16. Electrochemical cell according to claim 13, wherein the band of insulating material is between about 3 and 125 mm wide.

17. Electrochemical cell according to claim 14, wherein the band of insulating material is about 6 mm wide.

18. Electrochemical cell according to claim 1, wherein the band of insulating material consists of a synthetic fabric which is chemically and electrochemically insulating and compatible with the materials of the cell.

* * * * *